(12) United States Patent
Kataoka et al.

(10) Patent No.: US 9,523,872 B2
(45) Date of Patent: Dec. 20, 2016

(54) OPTICAL DEVICE

(71) Applicant: Sumitomo Osaka Cement Co., Ltd., Tokyo (JP)

(72) Inventors: Toshio Kataoka, Tokyo (JP); Norikazu Miyazaki, Tokyo (JP); Youichi Hosokawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 15/082,003

(22) Filed: Mar. 28, 2016

(65) Prior Publication Data

US 2016/0291351 A1  Oct. 6, 2016

(30) Foreign Application Priority Data

Mar. 31, 2015 (JP) ................................ 2015-072725

(51) Int. Cl.
*G02F 1/035* (2006.01)
*G02F 1/03* (2006.01)
(Continued)

(52) U.S. Cl.
CPC ............. *G02F 1/0316* (2013.01); *G02F 1/025* (2013.01); *G02F 1/2255* (2013.01); *G02B 6/12* (2013.01); *G02F 2201/121* (2013.01)

(58) Field of Classification Search
CPC ..... G02B 6/12; G02B 6/12007; G02F 1/0147; G02F 1/025; G02F 1/035; G02F 1/0316; G02F 1/0356; G02F 1/225; G02F 1/2255; G02F 2201/121; G02F 2201/212; H04B 10/505; H04B 10/50575; H04B 10/5053; H04B 10/50577; H04B 10/5561
(Continued)

(56) References Cited

U.S. PATENT DOCUMENTS 8,135,242 B2 *  3/2012  Sugiyama ............. G02F 1/0316
385/14
2009/0290828 A1  11/2009  Shimizu et al.
2011/0157673 A1  6/2011  Mitomi et al.

FOREIGN PATENT DOCUMENTS

JP    2002513226 A   5/2002
JP    2007139987 A   6/2007
WO    WO 2010-021193 A1   2/2010

* cited by examiner

*Primary Examiner* — Akm Enayet Ullah
*Assistant Examiner* — Michael Mooney
(74) *Attorney, Agent, or Firm* — Taft Stettinius & Hollister LLP

(57) ABSTRACT

[Task] Reduction in crosstalk between signal electrodes.
[Means for Resolution] An optical modulator 1 includes a relay substrate 3 including a substrate portion 30, and signal electrodes 31 and 32, and a ground electrode 33 which are provided on the substrate portion 30, and an optical waveguide substrate 4 including an electrode-optical substrate 40, signal electrodes 431 and 432, and an optical waveguide 42 which are provided on the electro-optical substrate 40. Modulation signals are input from ends 31a and 32a on one side of the signal electrodes 31 and 32, the other end 31b of the signal electrode 31 is electrically connected to the signal electrode 431, the other end 32b of the signal electrode 32 is electrically connected to the signal electrode 432, an optical wave, which propagates through the optical waveguide 42, is modulated by the modulation signals which propagate through the signal electrodes 431 and 432, the ground electrode 33 is provided between the signal electrodes 31 and 32, and the relay substrate 3 includes a first adjacent portion 44 at which the signal electrodes 31 and 32 are adjacent to each other, and a through-hole 30g that is provided in the ground electrode 33 at the first adjacent portion 44.

11 Claims, 9 Drawing Sheets

(51) Int. Cl.
*G02F 1/025* (2006.01)
*G02F 1/225* (2006.01)
*G02B 6/12* (2006.01)

(58) Field of Classification Search
USPC .......................................................... 385/1–3
See application file for complete search history.

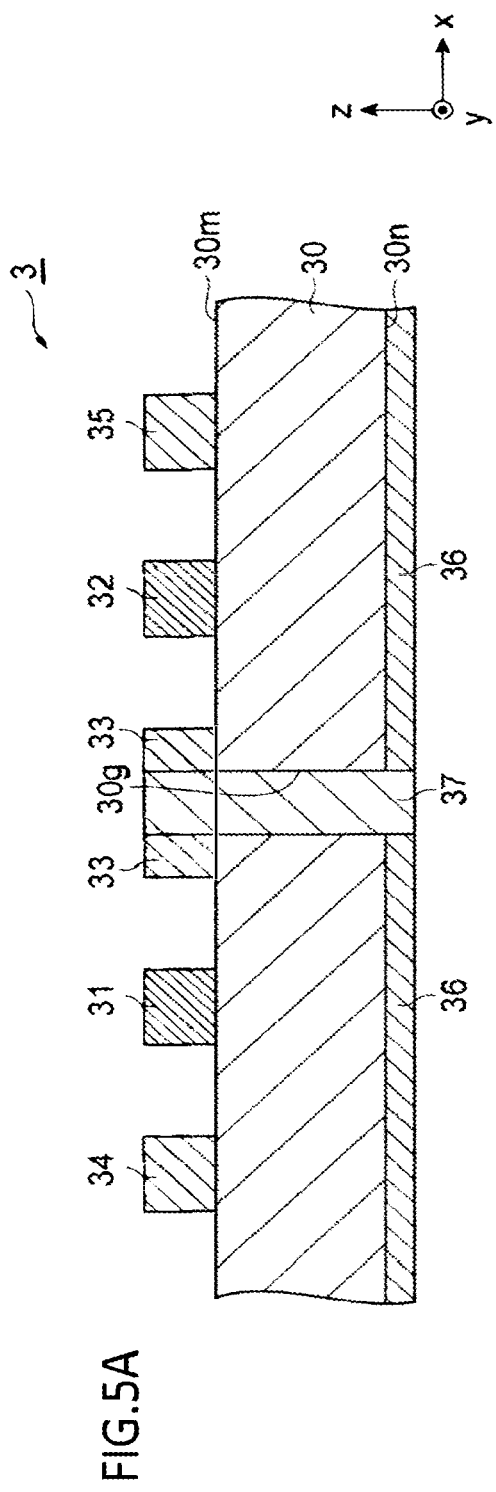
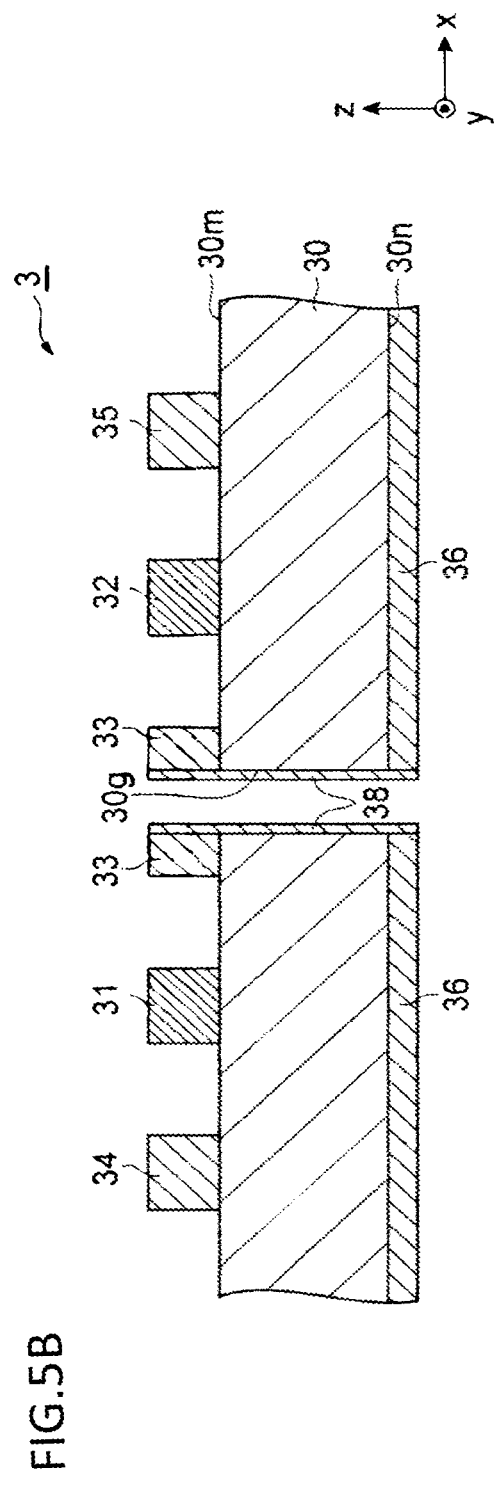

ically, it is preferable to shorten a distance from the input pad section to the operation region as much as possible so as to suppress a transmission loss of the modulation signal to the minimum. For this effect, a configuration, in which spacing between the signal electrodes in the input pad section of the electro-optical substrate is narrowed as much as possible, is employed in the related art. Therefore, it is also necessary to narrow spacing between the signal elec-

OPTICAL DEVICE

CROSS-REFERENCE TO RELATED APPLICATIONS

This application claims the benefit of Japanese Patent Application No. 2015-072725 filed Mar. 31, 2015, the disclosure of which is herein incorporated by reference in its entirety.

TECHNICAL FIELD

The present invention relates to an optical device.

BACKGROUND ART

Along with recent high-frequency and high-capacity communication, a multi-level phase modulation method such as differential quadrature phase shift keying (DQPSK) is employed in an optical device such as an optical modulator. In addition, integration is in progress in a dual polarization-quadrature phase shift keying (DP-QPSK) modulator in which two DQPSK modulators are polarization-multiplexed, and thus the number of signal electrodes, which are provided in a modulator, increases.

RELATED ART DOCUMENT

Patent Document

[Patent Document 1] International Publication No. WO2010/021193
[Patent Document 2] PCT Japanese Translation Patent Publication No. 2002-513226
[Patent Document 3] Japanese Laid-open Patent Publication No. 2007-139987

DISCLOSURE OF THE INVENTION

Problem that the Invention is to Solve

Patent Document 1 discloses a DQPSK type optical modulator, and a plurality of signal electrodes and a ground electrode (not illustrated) are formed on a substrate (hereinafter, referred to as "electro-optical substrate") having an electro-optic effect, and a relay substrate that is disposed in the vicinity of the electro-optical substrate. A modulation signal is input from a connector, propagates through the signal electrodes on the relay substrate, and is input to the signal electrodes on the electro-optical substrate through an input pad section. A phase of light, which propagates through an optical waveguide on the electro-optical substrate, varies in accordance with electric field intensity of a modulation signal in an operation region, and thus the light is modulated.

In the integration type modulator as described above, it is important to match the timing at which the modulation signal reaches the operation region, and an amplitude level of the modulation signal between the signal electrodes. In addition, it is preferable to shorten a distance from the input pad section to the operation region as much as possible so as to suppress a transmission loss of the modulation signal to the minimum. For this effect, a configuration, in which spacing between the signal electrodes in the input pad section of the electro-optical substrate is narrowed as much as possible, is employed in the related art. Therefore, it is also necessary to narrow spacing between the signal electrodes on an output side (side that is connected to the input pad section of the electro-optical substrate) in the relay substrate as described above. However, when the spacing between the signal electrodes is narrowed, there is a problem that crosstalk is likely to occur between the signal electrodes.

In addition, in consideration of suppression of crosstalk, a configuration in which a ground electrode having a finite width is individually disposed with respect to the respective signal electrodes is advantageous over a configuration in which the ground electrode between the signal electrodes is set as a ground electrode common to the signal electrodes. However, it is difficult to dispose the ground electrode in a narrow area between the signal electrodes. Therefore, the ground electrode, which is common, is disposed between the signal electrodes, but there is a problem that the effect of suppressing crosstalk is lower in comparison to the case of individually disposing the ground electrode having a finite width with respect to the signal electrodes as described above.

Patent Document 2 discloses a configuration in which in a substrate on which signal electrodes and a ground electrode are formed, a resistive thin film is formed along the ground electrode to absorb an unnecessary electric field. When the resistive thin film is formed on the relay substrate disclosed in Patent Document 1, it is possible to suppress crosstalk between the signal electrodes, but it is necessary to form the resistive thin film having an area sufficient to absorb the unnecessary electric field, and thus there is a problem that miniaturization and integration are difficult.

In addition, in an optical modulator having a configuration disclosed in Patent Document 3, a plurality of relay electrodes, which have a coplanar waveguide (CPW) structure including signal electrodes and ground electrodes between which each of the signal electrodes is disposed, are formed on the relay substrate. In the relay substrate, an input coaxial connector configured to input an electrical signal is connected to one side of the signal electrode, and the other side of the signal electrode is connected to an electrode on the electro-optical substrate. In addition, the signal electrode on the relay substrate is disposed to be routed on the relay substrate so as to adjust the length of a transmission channel. A spacing between the signal electrodes in the relay substrate is set to a spacing of approximately 4 mm in consideration of a connector width in the vicinity of an input connector, and is set to, for example, a spacing as narrow as approximately 1000 μm in the vicinity of a connection point with the electro-optical substrate in conformity to the spacing of the electrodes on the electro-optical substrate. The modulation signal is input from the input coaxial connector to the electrodes on the electro-optical substrate through the relay electrodes on the relay substrate.

In the above-described configuration, in the vicinity of a connection point between the input coaxial connector and the signal electrode on the relay substrate, an electrode configuration varies from a coaxial configuration to CPW. However, at a portion in which a structure of this transmission line varies, a radiation mode due to leakage of an electrical signal is likely to occur, or input of the radiation mode is likely to occur. According to this, the radiation mode, which is leaked in the vicinity of the connection point between the input coaxial connector and the signal electrode on the relay substrate, may enter the relay substrate from a top surface of the relay substrate, a lateral surface thereof, and the like, may propagate through the inside of the relay substrate, and may be recoupled to the same signal electrode and other signal electrodes. Therefore, there is a concern that degradation of modulation characteristics of the optical modulator may be caused.

In addition, an output side signal electrode formed on the relay substrate and the signal electrode formed on the electro-optical substrate are connected by wire bonding and the like. With regard to an electrode structure at the connection site, a transmission line structure varies from CPW to wire bonding, and from wire bonding to CPW on the electro-optical substrate, and thus leakage of the electrical signal is also likely to occur in the vicinity of the connection point between the signal electrode on the relay substrate and the wire bonding, or input of the electrical signal is also likely to occur. According to this, electrical signals, which are leaked in the vicinity of the connection point between the input coaxial connector and the electrode on the relay substrate, may be recoupled in the vicinity of the connection point between the signal electrode formed on the relay substrate and the wire bonding. As a result, there is a concern that the modulation characteristics of the optical modulator may degrade.

In addition, as the number of the signal electrodes increases, the more problems relating to crosstalk to other signal electrodes are likely to occur. Particularly, in recent optical modulators, integration has been progressed, and thus a plurality of connection sites between signal electrodes formed on the relay substrate and signal electrodes formed on the electro-optical substrate have become very close to each other. Accordingly, the plurality of signal electrodes are likely to be simultaneously affected by the radiation mode, and thus degradation of the modulation characteristics becomes more problematic. In addition, a modulation signal is set to a high frequency of 20 GHz or higher, and this configuration is one of the causes for occurrence of crosstalk.

An object of the invention is to provide an optical device having a structure capable of reducing crosstalk between signal electrodes.

Means for Solving the Problem

According to an aspect of the invention, there is provided an optical device including a relay substrate and an optical waveguide substrate. The relay substrate includes a substrate portion, and a first signal electrode, a second signal electrode, and a ground electrode which are provided to the substrate portion. The optical waveguide substrate includes an electro-optical substrate having an electro-optic effect, and a third signal electrode, a fourth signal electrode, and an optical waveguide which are provided on the electro-optical substrate. Modulation signals are input from one end of the first signal electrode and one end of the second signal electrode, respectively, the other end of the first signal electrode is electrically connected to the third signal electrode, the other end of the second signal electrode is electrically connected to the fourth signal electrode, and an optical wave which propagates through the optical waveguide is modulated by the modulation signals which propagate through the third signal electrode and the fourth signal electrode. The ground electrode is provided between the first signal electrode and the second signal electrode, and the relay substrate includes an adjacent portion at which the first signal electrode and the second signal electrode are adjacent to each other, and an aperture that is provided in the ground electrode at the adjacent portion.

According to this optical device, the aperture is provided in the ground electrode, which is provided between the first signal electrode and the second signal electrode, at the adjacent portion. The aperture can trap lines of electric force which occur between the first signal electrode and the second signal electrode, and thus it is possible to suppress crosstalk between the first signal electrode and the second signal electrode.

The adjacent portion may be located in the vicinity of a position at which the first signal electrode is electrically connected to the third signal electrode, and the second signal electrode is electrically connected to the fourth signal electrode. Particularly, in an optical device which is miniaturized and integrated, the first signal electrode and the second signal electrode may be adjacent to each other in the vicinity of a position at which the first signal electrode and the second signal electrode are electrically connected to the third signal electrode and the fourth signal electrode, respectively. In this case, crosstalk is likely to occur between the first signal electrode and the second signal electrode. However, when employing this configuration, it is possible to suppress crosstalk as described above while maintaining miniaturization and integration.

The ground electrode may include two branched ground electrodes, one of the two branched ground electrodes may be disposed along the first signal electrode, and the other of the two branched ground electrodes may be disposed along the second signal electrode. In this case, it is possible to reduce crosstalk between the first signal electrode and the second signal electrode at a site at which the branched ground electrodes are provided. In addition, it is not necessary to provide the ground electrode to fill a space between the first signal electrode and the second signal electrode, and thus it is possible to suppress a used amount of an expensive member such as gold (Au) that is used in the ground electrode.

The branched ground electrodes may include another aperture. In this case, the number of the apertures which are provided in the ground electrode increases, and thus it is possible to further suppress crosstalk between the first signal electrode and the second signal electrode.

A distance between the first signal electrode and the second signal electrode at the adjacent portion may be 300 µm to 1000 µm. In this case, even in a configuration in which the distance between the first signal electrode and the second signal electrode is very short, it is possible to suppress crosstalk between the first signal electrode and the second signal electrode.

A distance between the other end of the first signal electrode and the other end of the second signal electrode may be shorter than a distance between the one end of the first signal electrode and the one end of the second signal electrode. In this case, even in a configuration in which the distance between the other end of the first signal electrode and the other end of the second signal electrode is very short as miniaturization and integration are realized, it is possible to suppress crosstalk between the first signal electrode and the second signal electrode.

The aperture may extend along a direction in which at least one of the first signal electrode and the second signal electrode, which are disposed on both sides of the aperture, extends. In this case, the proportion of a region in which an air layer and the like are formed increases, and thus it is possible to efficiently trap lines of electric force which occur between the first signal electrode and the second signal electrode. According to this, it is possible to efficiently reduce crosstalk between the first signal electrode and the second signal electrode.

The aperture may be a recess formed by digging into the relay substrate, or a through-hole that passes through the relay substrate. For example, an air layer is formed in the recess or the through-hole, and a dielectric constant of the air layer is lower than a dielectric constant of the relay substrate. According to this, it is possible to reduce the mutual capacitance between the first signal electrode and the second signal electrode, and thus it is possible to reduce crosstalk between the first signal electrode and the second signal electrode.

The optical device may further include a low dielectric constant portion that is provided in the recess or the through-hole, and the low dielectric constant portion may have a dielectric constant lower than a dielectric constant of the substrate portion. In this case, the low dielectric constant portion, which has a dielectric constant lower than a dielectric constant of the substrate portion, is provided between the first signal electrode and the second signal electrode, and thus it is possible to reduce the mutual capacitance between the first signal electrode and the second signal electrode. According to this, it is possible to reduce crosstalk between the first signal electrode and the second signal electrode.

The optical waveguide substrate and the relay substrate may further include one or more signal electrodes. Particularly, in an optical device that is miniaturized and integrated, as the number of signal electrodes increases, spacing between the respective signal electrodes may be shortened. In this case, crosstalk is likely to occur between the respective signal electrodes. However, when employing this configuration, it is possible to suppress crosstalk as described above while maintaining miniaturization and integration.

The aperture may be disposed in a straight line connecting the one end of the first signal electrode and the other end of the first signal electrode, or in a straight line connecting the one end of the first signal electrode and the other end of the second signal electrode. In this case, when the aperture is provided in a straight line as described above, the aperture can trap a radiation mode that occurs at the one end of the first signal electrode. According to this, the radiation mode, which occurs at the one end of the first signal electrode, is prevented from being recoupled to the other end of the first signal electrode or the other end of the second signal electrode.

As a result, it is possible to suppress degradation of modulation characteristics of the optical modulator.

Advantage of the Invention

According to the invention, it is possible to reduce crosstalk between signal electrodes.

BRIEF DESCRIPTION OF THE DRAWINGS

FIGS. 5A and 5B are views schematically illustrating another example of the cross-section along line in FIG. 2.

BEST MODE FOR CARRYING OUT THE INVENTION

Hereinafter, embodiments of the invention will be described in detail with reference to the accompanying drawings.

Figure 1:
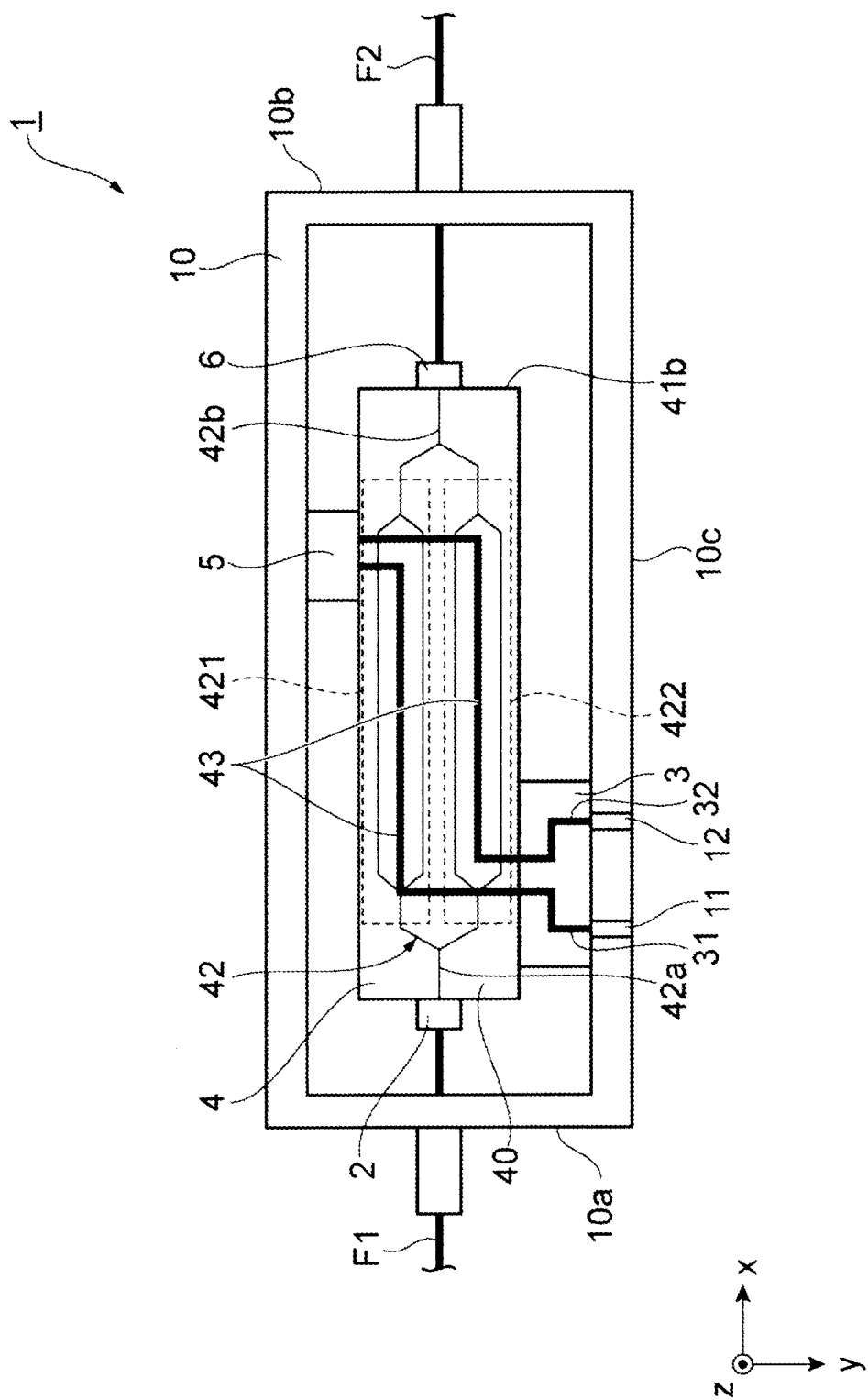
FIG. 1 is a view schematically illustrating a configuration of an optical modulator according to an embodiment.

FIG. 1 is a view schematically illustrating a configuration of an optical modulator according to an embodiment. As illustrated in FIG. 1, an optical modulator 1 is an optical device that modulates input light that is introduced by optical fiber F1, and outputs modulated light to optical fiber F2. The optical modulator 1 may include a light input portion 2, a relay substrate 3, an optical waveguide substrate 4, a termination portion 5, a light output portion 6, and a package case 10.

For example, the package case 10 is constituted by stainless steel, and has an end surface 10a and an end surface 10b which are opposite to each other. A fiber insertion hole, to which optical fiber F1 is inserted, is provided in the end surface 10a. A fiber insertion hole, to which optical fiber F2 is inserted, is provided in the end surface 10b.

The optical fiber F1 is connected to the optical waveguide of the optical waveguide substrate 4, and light, which propagates through the optical fiber F1, is input to the optical waveguide of the optical waveguide substrate 4. The light input portion 2 is a component that assists the connection strength between the optical fiber F1 and the optical waveguide substrate 4, and is constituted by, for example, glass capillary.

The relay substrate 3 relays a modulation signal that is an electrical signal supplied from an outer side, and outputs the modulation signal to the optical waveguide substrate 4. The modulation signal is input to a signal electrode 31 (first signal electrode) and a signal electrode 32 (second signal electrode) of the relay substrate 3, for example, through a connector 11 and a connector 12 for modulation signal input which are provided on a lateral surface 10c of the package case 10, and the signal electrodes 31 and 32 output the modulation signal to a signal electrode 43 of the optical waveguide substrate 4. For example, a frequency of the modulation signal has a wide band from DC to 20 GHz or greater.

The optical waveguide substrate 4 includes an electro-optical substrate 40 having an electro-optic effect. The optical waveguide substrate 4 is a dielectric material having the electro-optic effect, and examples thereof include lithium niobate ($LiNbO_3$, hereinafter, referred to as "LN") and the like. The optical waveguide substrate 4 includes an optical waveguide 42, and the optical waveguide 42 forms a Mach-Zehnder type interferometer.

The signal electrode 43 is provided on the electro-optical substrate 40. The modulation signal, which is output from each of the signal electrode 31 or the signal electrode 32 of the relay substrate 3, is input to each of the signal electrodes 43. An electric field in accordance with the intensity of the modulation signal is applied to light that propagates through the optical waveguide 42, and thus the light is phase-modulated. In this example, the number of the signal electrodes in the optical waveguide substrate 4 and the relay substrate 3 is set to two. However, in a case where the optical modulator 1 is a different modulator such as a DP-QPSK modulator, the number may further increase.

In the optical waveguide substrate 4, input light, which is input from the light input portion 2 to the optical waveguide substrate 4, is input to an input waveguide 42a, and is branched into two light beams. The two light beams are input to a sub-Mach-Zehnder portion 421 and a sub-Mach-Zehnder portion 422, respectively. The branched input light beams are modulated in the sub-Mach-Zehnder portion 421 and the sub-Mach-Zehnder portion 422. After a phase difference of 90° is applied to a modulated light beam that is modulated in the sub-Mach-Zehnder portion 421, and a modulated light beam that is modulated in the sub-Mach-Zehnder portion 422, the modulated light beams are multiplexed, and the resultant multiplexed light propagates through an output waveguide 42b and is output therefrom. This example is a so-called nest type configuration, and is applicable to a modulation type such as DQPSK.

The termination portion 5 is provided in correspondence with each of the signal electrodes 43 of the optical waveguide substrate 4, and is constituted by, for example, a resistor. The resistor is electrically connected to the signal electrode 43 of the optical waveguide substrate 4, and electrically terminates the modulation signal.

The light output portion 6 outputs the modulated light, which is output from the optical waveguide substrate 4, to the optical fiber F2. The light output portion 6 is provided at an end 41b of the electro-optical substrate 40.

Next, an embodiment of the relay substrate 3 will be described in detail.

First Embodiment

Figure 2:
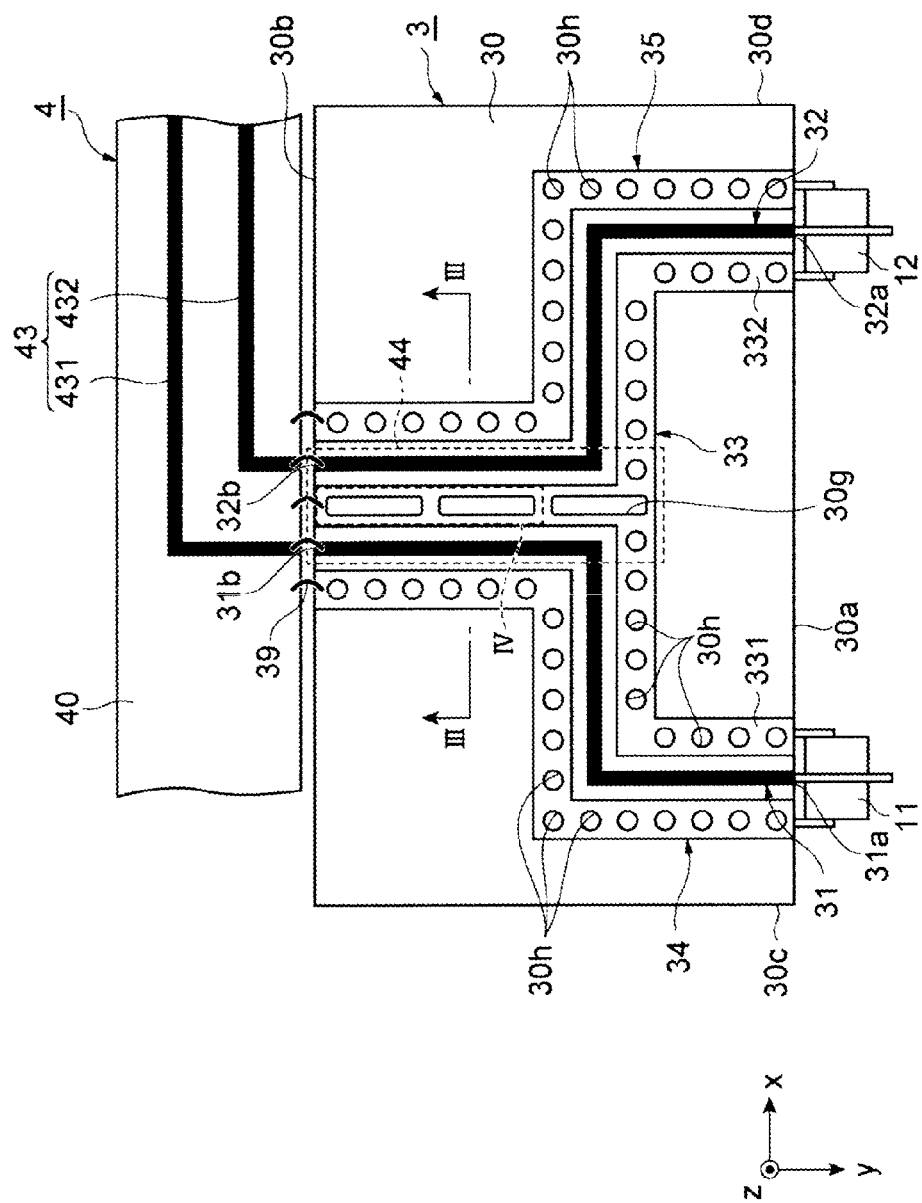
FIG. 2 is a view schematically illustrating a configuration of a relay substrate according to a first embodiment.
Figure 3:
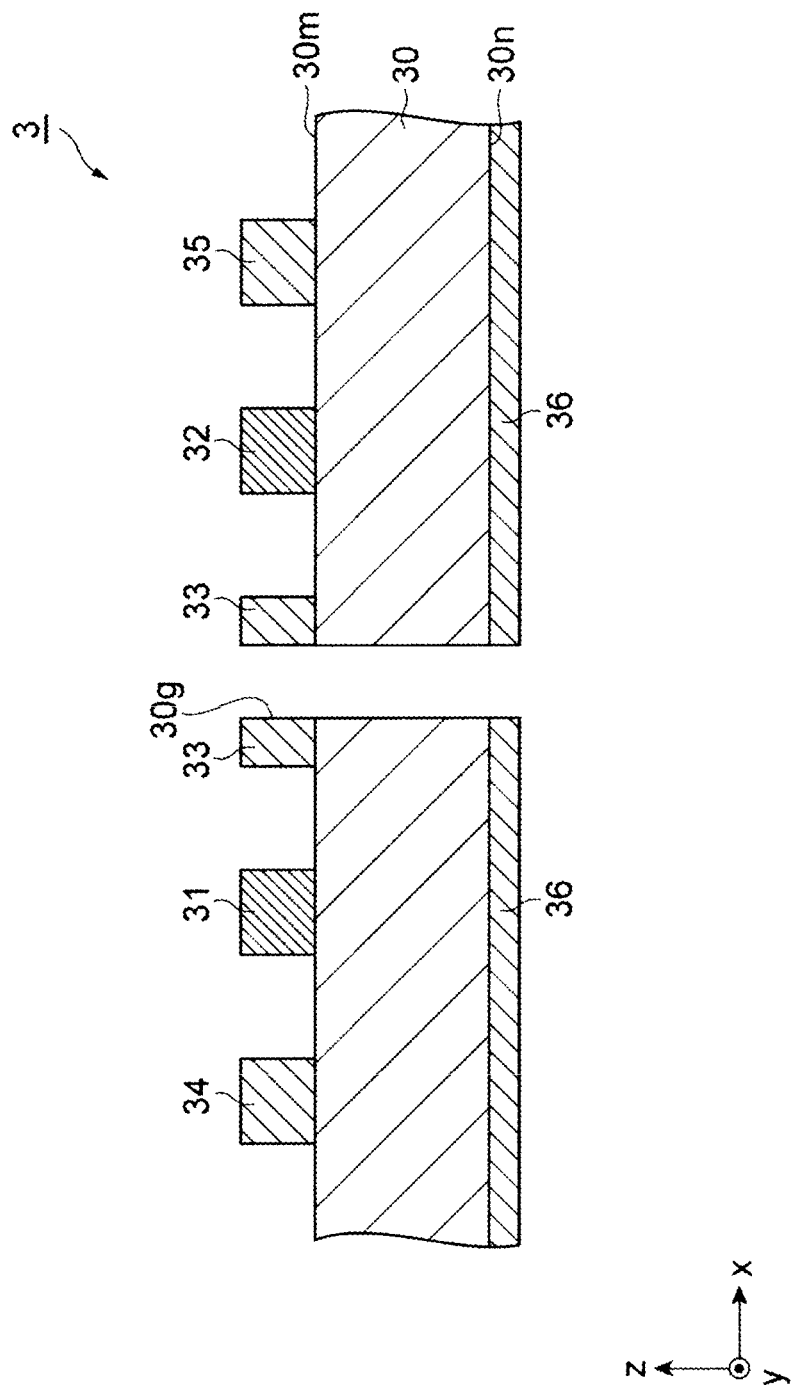
FIG. 3 is a view schematically illustrating a cross-section taken along line in FIG. 2.
Figure 4:
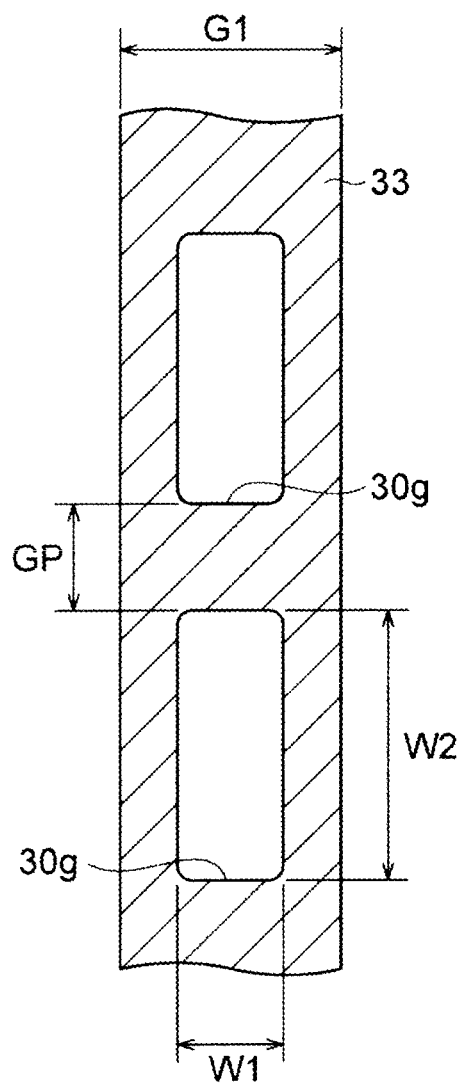
FIG. 4 is a view schematically illustrating a cross-section along a main surface of the relay substrate in a portion surrounded by line IV in FIG. 2.

FIG. 2 is a view schematically illustrating a configuration of the relay substrate 3 according to a first embodiment. FIG. 3 is a view schematically illustrating a cross-section taken along line III-III in FIG. 2. FIG. 4 is a view schematically illustrating a cross-section along a main surface of the relay substrate in a portion surrounded by line IV in FIG. 2. As illustrated in FIGS. 2 to 4, the relay substrate 3 may include a substrate portion 30, the signal electrode 31, the signal electrode 32, a ground electrode 33, a ground electrode 34, a ground electrode 35, and a ground electrode 36. In addition, the connector 11 and the connector 12 are attached to an end 30a of the relay substrate 3.

The substrate portion 30 is a plate-shaped member, and is constituted by, for example, a ceramic material such as alumina ($Al_2O_3$). The length of the substrate portion 30 in a direction X is, for example, approximately 1 mm to 30 mm, and the length of the substrate portion 30 in a direction Y perpendicular to the direction X is, for example, approximately 1 mm to 10 mm. The thickness of the substrate portion 30 in a direction Z is, for example, approximately 0.1 mm to 1.6 mm. The substrate portion 30 has the end 30a and an end 30b which are both ends in the direction Y, and an end 30c and an end 30d which are both ends in the direction X. The substrate portion 30 has a main surface 30m, and a back surface 30n that is opposite to the main surface 30m.

The relay substrate 3 has a through-hole 30g as an aperture. The through-hole 30g is a through-hole that is provided to pass through from the ground electrode 33 provided on the main surface 30m to the back surface 30n (to the ground electrode 36 in a case where the ground electrode 36 is provided on the back surface 30n). Details of the through-hole 30g will be described later. The relay substrate 3 is accommodated in the package case 10 in such a manner that the back surface 30n faces the bottom of the package case 10, and the end 30a is located on an inner wall side of the lateral surface 10c of the package case 10. In addition, the aperture in the invention represents an aperture that is provided in only a part of the ground electrode that is formed on the main surface 30m of the substrate portion 30, a recess obtained by digging into the ground electrode formed on the main surface 30m of the substrate portion 30, and the substrate portion 30 to a depth partway through the thickness thereof, or a through-hole that passes through from the ground electrode formed on the main surface 30m of the substrate portion 30 to the back surface 30n of the substrate portion 30. For convenience of explanation, the aperture, which is provided only at a part of the ground electrode formed on the main surface 30m of the substrate portion 30, is referred to as the aperture in this specification, and the other apertures may be referred to as a recess or a through-hole.

The signal electrode 31 and the signal electrode 32 are provided on the main surface 30m of the substrate portion 30, and is constituted by, for example, gold (Au). In the signal electrode 31, one end 31a is electrically connected to a terminal of the connector 11, and the other end 31b is electrically connected to a signal electrode 431 (third signal electrode) of the optical waveguide substrate 4. In the signal electrode 32, one end 32a is electrically connected to a terminal of the connector 12, and the other end 32b is electrically connected to a signal electrode 432 (fourth signal electrode) of the optical waveguide substrate 4. A spacing between the signal electrode 31 and the signal electrode 32 is as wide as approximately 4 mm in consideration of a width of the connector in the vicinity of a connection point with the connector, and is as narrow as approximately 1000 μm in conformity to an electrode spacing of the optical waveguide substrate 4 in the vicinity of a connection point with the optical waveguide substrate 4. The modulation signal that is supplied from an outer side is input to the one end 31a of the signal electrode 31 through the connector 11, and is output from the other end 31b of the signal electrode 31 to the signal electrode 431 of the optical waveguide substrate 4 through wire bonding 39. Similarly, the modulation signal is input to the one end 32a of the signal electrode 32 through the connector 12, and is output from the other end 32b of the signal electrode 32 to the signal electrode 432. The width of the signal electrode 31 and the signal electrode 32 is, for example, approximately 50 μm to 200 μm.

In the vicinity of a position at which the signal electrode 31 and the signal electrode 32 are electrically connected to the signal electrode 431 and the signal electrode 432 of the optical waveguide substrate 4, respectively, the signal electrode 31 and the signal electrode 32 form a first adjacent portion 44 at which the spacing between the signal electrode 31 and the signal electrode 32 is smaller in comparison to the spacing at the other portions. A distance between the signal electrodes 31 and 32 at the first adjacent portion 44 is, for example, approximately 300 μm to 1000 μm. In addition, in the above description, a position of the first adjacent portion 44 is set to the vicinity of a position at which the signal electrode 31 and the signal electrode 32 are electrically connected to the signal electrode 431 and the signal electrode 432 of the optical waveguide substrate 4, respectively. However, the position of the first adjacent portion 44 is not limited thereto, and may be other positions such as a position partway along the signal electrode 31 or the signal electrode 32.

The ground electrode 33 is an electrode that is connected to a ground potential, and is constituted by, for example, gold (Au). The ground electrode 33 is provided on the main surface 30m of the substrate portion 30, and is disposed between the signal electrode 31 and the signal electrode 32. The ground electrode 33 is disposed with spacing of, for example, approximately 50 µm to 500 µm with respect to each of the signal electrode 31 and the signal electrode 32. The ground electrode 33 has a predetermined width G1, and extends along, for example, the signal electrode 31 and the signal electrode 32. The width G1 of the ground electrode 33 is, for example, approximately 50 µm to 500 µm.

In addition, a part of the ground electrode 33 is branched into a branched ground electrode 331 and a branched ground electrode 332, and the branched ground electrode 331 and the branched ground electrode 332 are provided along the signal electrode 31 and the signal electrode 32, respectively. According to this, it is possible to reduce crosstalk between the signal electrode and the signal electrode 32 at a site at which the branched ground electrodes 331 and 332 are provided, and it is possible to suppress a used amount of an expensive member such as Au that is used in the ground electrode. In addition, in this embodiment, the ground electrode 33 is configured to be branched into the branched ground electrode 331 and the branched ground electrode 332, but it is not necessary for the ground electrode 33 to be branched, and ground electrode 33 may be uniformly provided between the signal electrode 31 and the signal electrode 32.

For example, the ground electrode 34 is constituted by gold (Au). The ground electrode 34 is provided on the main surface 30m of the substrate portion 30, and is disposed in such a manner that the signal electrode 31 is interposed between the ground electrode 34 and the ground electrode 33. The ground electrode 34 is disposed with a spacing of, for example, approximately 80 µm with respect to the signal electrode 31. The ground electrode 34 extends along the signal electrode 31, for example, in a predetermined width. The width of the ground electrode 34 is, for example, approximately 70 µm. This configuration is also same to the ground electrode 35 that is disposed along the signal electrode 32.

The ground electrode 36 is constituted by, for example, gold (Au). The ground electrode 36 is provided on the back surface 30n of the substrate portion 30.

The through-hole 30g is provided in the first adjacent portion 44. The through-hole 30g passes through from the ground electrode 33 provided on the main surface 30m of the substrate portion 30 to the ground electrode 36 provided on the back surface 30n of the substrate portion 30. The through-hole 30g extends along a direction in which the signal electrode 31 and the signal electrode 32 on both sides of the through-hole 30g extend, and a shape thereof in a plan view is, for example, a rectangular shape.

For example, the length W2 of the through-hole 30g along a direction, in which the through-hole 30g extends, is 100 µm to 1000 µm. For example, the length W1 of the through-hole 30g along a direction perpendicular to the direction, in which the through-hole 30g extends, is approximately 100 µm to 1000 µm. In addition, a plurality of the through-holes 30g may be provided in the first adjacent portion 44. In this case, for example, a spacing GP between the through-holes 30g adjacent to each other is 100 µm or greater.

In addition, an air layer is formed inside each of the through-holes 30g. A dielectric constant of the air layer is smaller than a dielectric constant of the substrate portion 30, and thus it is possible to reduce the mutual capacitance between the signal electrode 31 and the signal electrode 32. According to this, it is possible to suppress lines of electric force propagating from either the signal electrode 31 or the signal electrode 32 to the other thereof. That is, it is possible to reduce crosstalk between the signal electrode 31 and the signal electrode 32.

Particularly, a cross-sectional shape of the through-hole 30g along the main surface 30m is a shape that extends along a direction in which the signal electrode 31 and the signal electrode 32 extends, and thus it is possible to increase the proportion of a region, in which the air layer is formed, between the signal electrode 31 and the signal electrode 32 in the first adjacent portion 44. According to this, the air layer can efficiently trap the lines of electric force, which propagate from either the signal electrode 31 or the signal electrode 32 to the other thereof, and thus it is possible to efficiently reduce crosstalk between the signal electrode 31 and the signal electrode 32. In addition, the shape of the through-hole 30g in a plan view is described as a rectangular shape, but the shape may be other shapes such as a circular shape or an elliptical shape.

As described above, the configuration in which the through-hole 30g is provided in the first adjacent portion 44 is very effective when considering that crosstalk between the signal electrodes on the relay substrate 3 is suppressed in the optical module for which miniaturization and integration are required. In addition, the configuration is effective for a configuration in which the distance between the signal electrodes 31 and 32 in the relay substrate 3 is set to be shorter at output ends (the other ends 31b and 32b) of the modulation signal in comparison to input ends (the one ends 31a and 32a).

The branched ground electrode 331 and the branched ground electrode 332 may have a plurality of through-holes 30h (another aperture). Each of the through-holes 30h passes through from the branched ground electrode 331 or the branched ground electrode 332 which is provided on the main surface 30m of the substrate portion 30 to the ground electrode 36 provided on the back surface 30n of the substrate portion 30. A shape of the through-hole 30h in a plan view is, for example, a circular shape, and the diameter of the through-hole 30h is, for example, approximately 100 µm. A spacing between the through-holes 30h adjacent to each other is, for example, approximately 100 µm. According to this configuration, as is the case with the through-hole 30g provided in the first adjacent portion 44, it is possible to reduce crosstalk between the signal electrode 31 and the signal electrode 32.

In addition, the branched ground electrode 331 and the branched ground electrode 332, and the ground electrode 36 provided on the back surface 30n of the substrate portion 30 may be electrically connected to each other through the through-hole 30h. In addition, here, the configuration in which the through-hole 30h is provided in the branched ground electrode 331 and the branched ground electrode 332 is described as an example, but there is no limitation to the configuration. For example, a recess may be provided instead of the through-hole 30h. In addition, even in a configuration in which an aperture other than the through-hole and the recess is provided only in the branched ground electrode 331 and the branched ground electrode 332, it is possible to obtain the same effect as described above.

The ground electrode 34 may have a plurality of the through-holes 30h. Each of the through-holes 30h passes through from the ground electrode 34 provided on the main surface 30m of the substrate portion 30 to the ground electrode 36 provided on the back surface 30n of the substrate portion 30. A shape of the through-hole 30h in a plan view is, for example, a circular shape, and the diameter of the through-hole 30h is, for example, approximately 100 µm. A spacing between the through-holes 30h adjacent to each other is, for example, approximately 100 µm. In addition, the ground electrode 35 may have the through-hole 30h in the same manner as in the ground electrode 34.

Next, description will be given of a modification example of the relay substrate 3. FIGS. 5A and 5B are views schematically illustrating another example of the cross-section along line in FIG. 2.

As illustrated in FIG. 5A, the relay substrate 3 may further include a low dielectric constant portion 37 having a dielectric constant lower than a dielectric constant of the substrate portion 30. The low dielectric constant portion 37 is provided to fill the through-hole 30g, and is constituted by, for example, a material such as polyimide and a silicone resin. The dielectric constant of the low dielectric constant portion 37 is, for example, approximately 3.5 to 4. The low dielectric constant portion 37 may be provided to fill the entirety of the through-hole 30g, or may be provided to fill a part of the through-hole 30g.

In this case, the dielectric constant of the low dielectric constant portion 37 is smaller than the dielectric constant of the substrate portion 30. Accordingly, as is the case with the air layer, it is possible to reduce the mutual capacitance between the signal electrode 31 and the signal electrode 32, and thus it is possible to reduce crosstalk between the signal electrode 31 and the signal electrode 32.

As illustrated in FIG. 5B, the relay substrate 3 may further include a conductive member 38 that is provided to cover an inner peripheral surface of the through-hole 30g. The conductive member 38 is a conductive member that electrically connects the ground electrode 33 and the ground electrode 36, and is constituted by, for example, a solder material, a silver (Ag) paste material, and the like. The conductive member 38 may be provided to fill the entirety of the through-hole 30g, or may be provided to fill a part of the through-hole 30g.

When the relay substrate 3 includes the conductive member 38 that is provided in the through-hole 30g, it is possible to make the potential of the ground electrode 33 in the vicinity of the through-hole 30g approximately the same as the ground potential of the ground electrode 36, and thus it is possible to improve uniformity of the potential of the ground electrode 33 in the vicinity of the through-hole 30g. According to this, it is possible to further reduce crosstalk between the signal electrode and the signal electrode 32. In addition, even when the above-described conductive member 38 is provided in the through hole 30h of the ground electrode 33, the ground electrode 34, and the ground electrode 35, the same effect can be exhibited.

Second Embodiment

Figure 6:
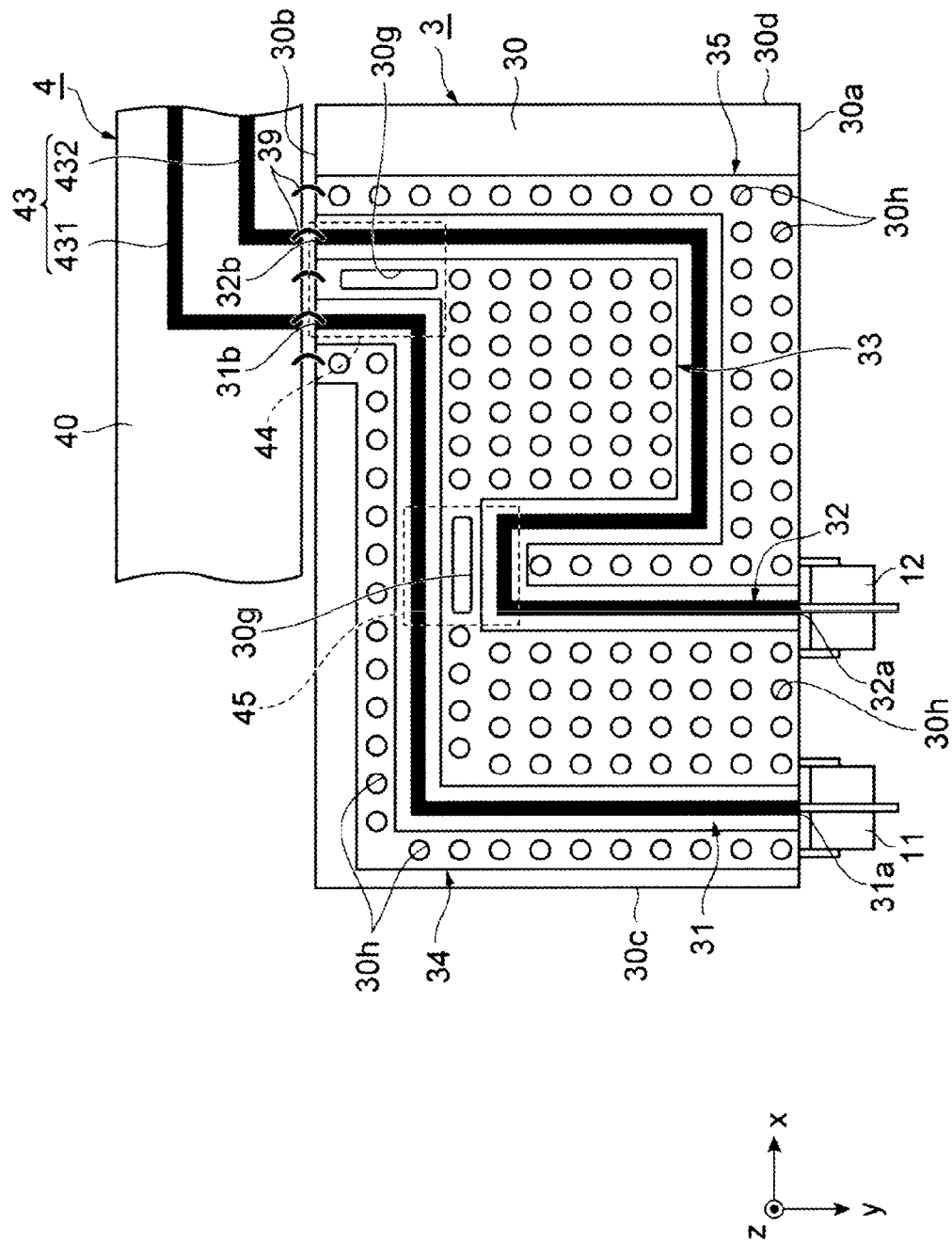
FIG. 6 is a view schematically illustrating a configuration of a relay substrate according to a second embodiment.

FIG. 6 is a view schematically illustrating a configuration of a relay substrate 3 according to a second embodiment. The relay substrate 3 according to the second embodiment is different from the relay substrate 3 according to the first embodiment in that a second adjacent portion 45 is further provided. As is the case with the first adjacent portion 44, the second adjacent portion 45 is a portion in which a spacing between the signal electrode 31 and the signal electrode 32 is shorter in comparison to a spacing at the other portions. In the relay substrate 3 of the first embodiment, the first adjacent portion 44 is provided in the vicinity of a position at which the signal electrode 31 and the signal electrode 32 are electrically connected to the signal electrode 431 and the signal electrode 432 of the optical waveguide substrate 4, respectively. However, in this embodiment, as illustrated in FIG. 6, the second adjacent portion 45 is provided at a position spaced away from the vicinity of a position at which the signal electrode 31 and the signal electrode 32 are electrically connected to the signal electrode 431 and the signal electrode 432 of the optical waveguide substrate 4, that is, partway along the signal electrode 31 and the signal electrode 32.

At the second adjacent portion 45, the signal electrode 31 and the signal electrode 32 are adjacent to each other, and a distance between the signal electrodes 31 and 32 is, for example, approximately 300 µm to 1000 µm. The relay substrate 3 also has the through-hole 30g in the second adjacent portion 45. The through-hole 30g provided in the second adjacent portion 45 extends along a direction in which the signal electrode 31 and the signal electrode 32 extend on both sides of the through-hole 30g, and a shape of the through-hole 30g in a plan view is, for example, a rectangular shape.

Even in the above-described relay substrate 3 of the second embodiment, as is the case with the above-described relay substrate 3 of the first embodiment, it is possible to reduce crosstalk between the signal electrode 31 and the signal electrode 32. In addition, in FIG. 6, the through-hole 30g is provided in both of the first adjacent portion 44 and the second adjacent portion 45. However, it is not necessary to provide the through-hole 30g in both of the first adjacent portion 44 and the second adjacent portion 45. When the through-hole 30g is provided in at least one of the first adjacent portion 44 and the second adjacent portion 45, it is possible to reduce crosstalk between the signal electrode 31 and the signal electrode 32. In addition, similarly, even in a case where two or more adjacent portions, at which the signal electrode 31 and the signal electrode 32 are adjacent to each other, are provided, when the through-hole 30g is provided in at least one adjacent portion, it is possible to reduce crosstalk between the signal electrode 31 and the signal electrode 32.

In addition, the optical device according to the invention is not limited to the embodiments. For example, the relay substrate 3 may further include one or more signal electrodes other than the signal electrode 31 and the signal electrode 32. In addition, the optical waveguide substrate 4 may further include one or more signal electrodes other than the signal electrode 431 and the signal electrode 432.

In addition, the back surface 30n of the substrate portion 30 may be fixed to the bottom of the package case 10 with a conductive adhesive or a solder material. In this case, a part of a conductive adhesive or a solder material may be provided in the through-hole 30g to function as the conductive member 38.

Figure 7:
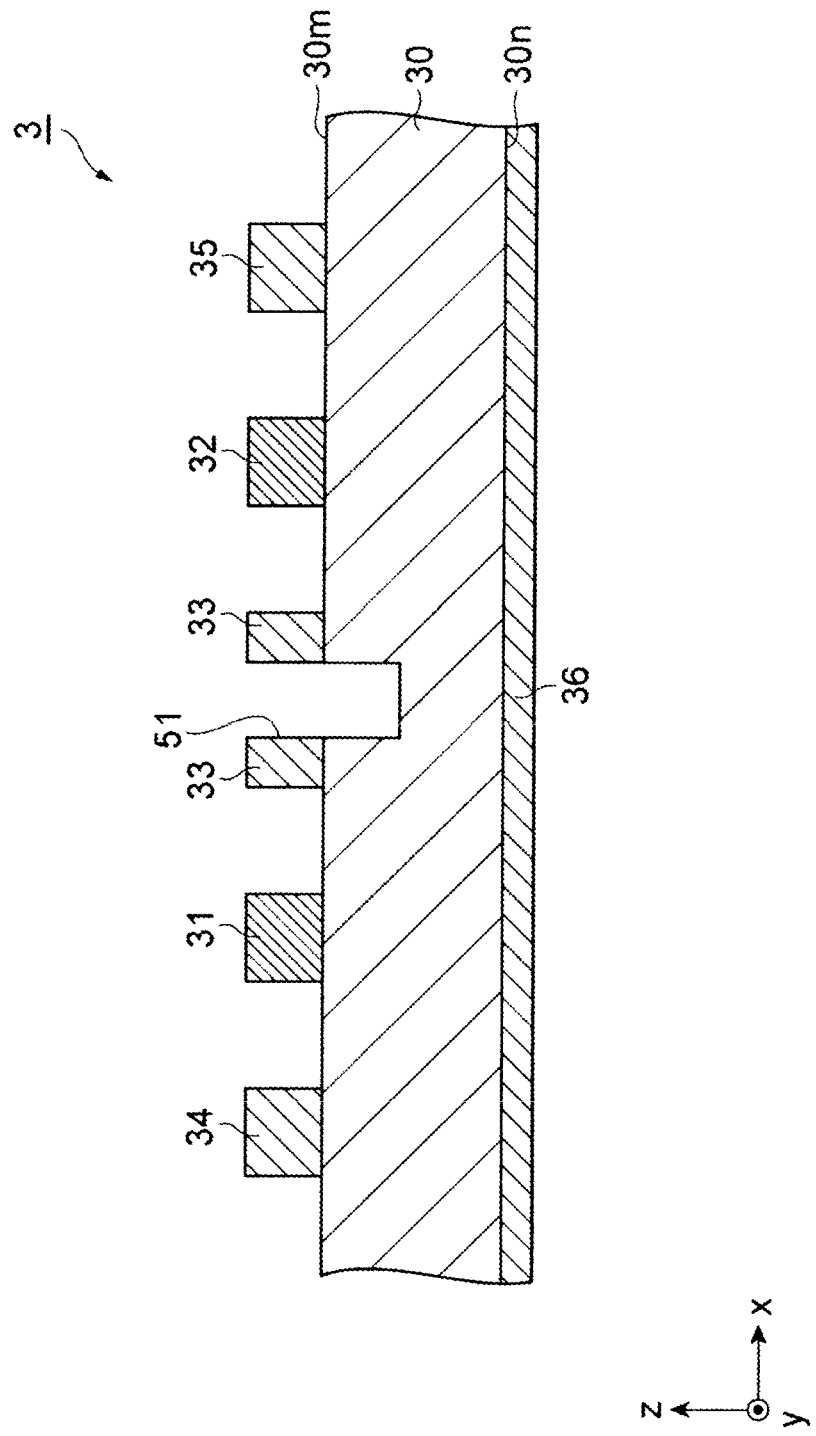
FIG. 7 is a view schematically illustrating still another example of the cross-section along line III-III in FIG. 2.

In addition, in the above-described embodiment, description is given of a configuration in which the through-hole 30g, which passes through from the ground electrode 33 on the main surface 30m of the substrate portion 30 to the ground electrode 36 on the back surface 30n of the substrate portion 30, is provided in the first adjacent portion 44 and the second adjacent portion 45, but there is no limitation to the configuration. For example, as illustrated in FIG. 7, a recess 51, which does not pass through the back surface 30n of the substrate portion 30 and is dug from the ground electrode 33 to a depth of the substrate portion 30 partway through the thickness thereof (in a direction Z), may be provided in the first adjacent portion 44 and the second adjacent portion 45 as an aperture instead of the through-hole 30g.

Figure 8:
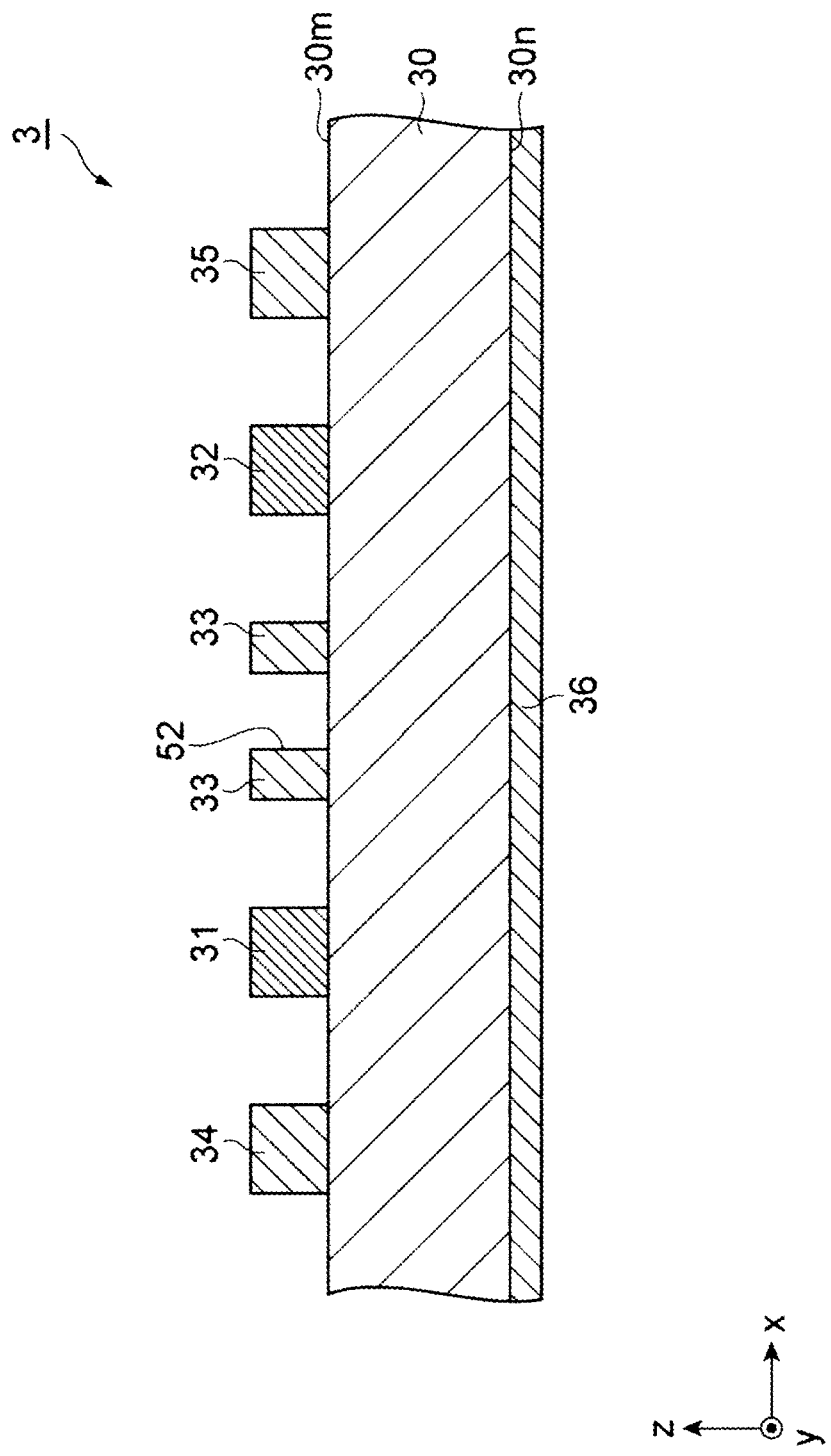
FIG. 8 is a view schematically illustrating still another example of the cross-section along line III-III in FIG. 2.

In addition, as illustrated in FIG. 8, at the first adjacent portion 44 and the second adjacent portion 45, an aperture 52 may be provided in only the ground electrode instead of the through-hole 30g. At a position at which the aperture 52 is provided, the substrate portion 30 is not recessed and is flat.

In addition, in the above-described embodiment, description is given of a configuration in which the distance between the signal electrodes 31 and 32 at the first adjacent portion 44 and the second adjacent portion 45 is set to, for example, approximately 300 µm to 1000 µm, but there is no limitation to the spacing. In a case where the distance between the signal electrodes 31 and 32 at the first adjacent portion 44 and the second adjacent portion 45 is 300 µm to 850 µm, it is more effective from the viewpoint of reduction of crosstalk between the signal electrodes 31 and 32. In addition, in a case where the distance between the signal electrodes 31 and 32 is 300 µm to 700 µm, it is more effective in consideration of reduction of crosstalk between the signal electrodes 31 and 32.

In addition, in the above-described embodiment, the signal electrodes 31 and 32 at the first adjacent portion 44 and the second adjacent portion 45 are parallel to each other, but the signal electrodes 31 and 32 may not be parallel to each other. In addition, the optical waveguide substrate 4 may be a modulation substrate including two or more signal electrodes, and may be a substrate having a function of controlling optical waves. According to this, the electro-optical substrate 40 is not limited to lithium niobate, and may be a substrate that is formed from various kinds of dielectric materials having an electro-optic effect, or a substrate formed from a semiconductor.

Figure 9:
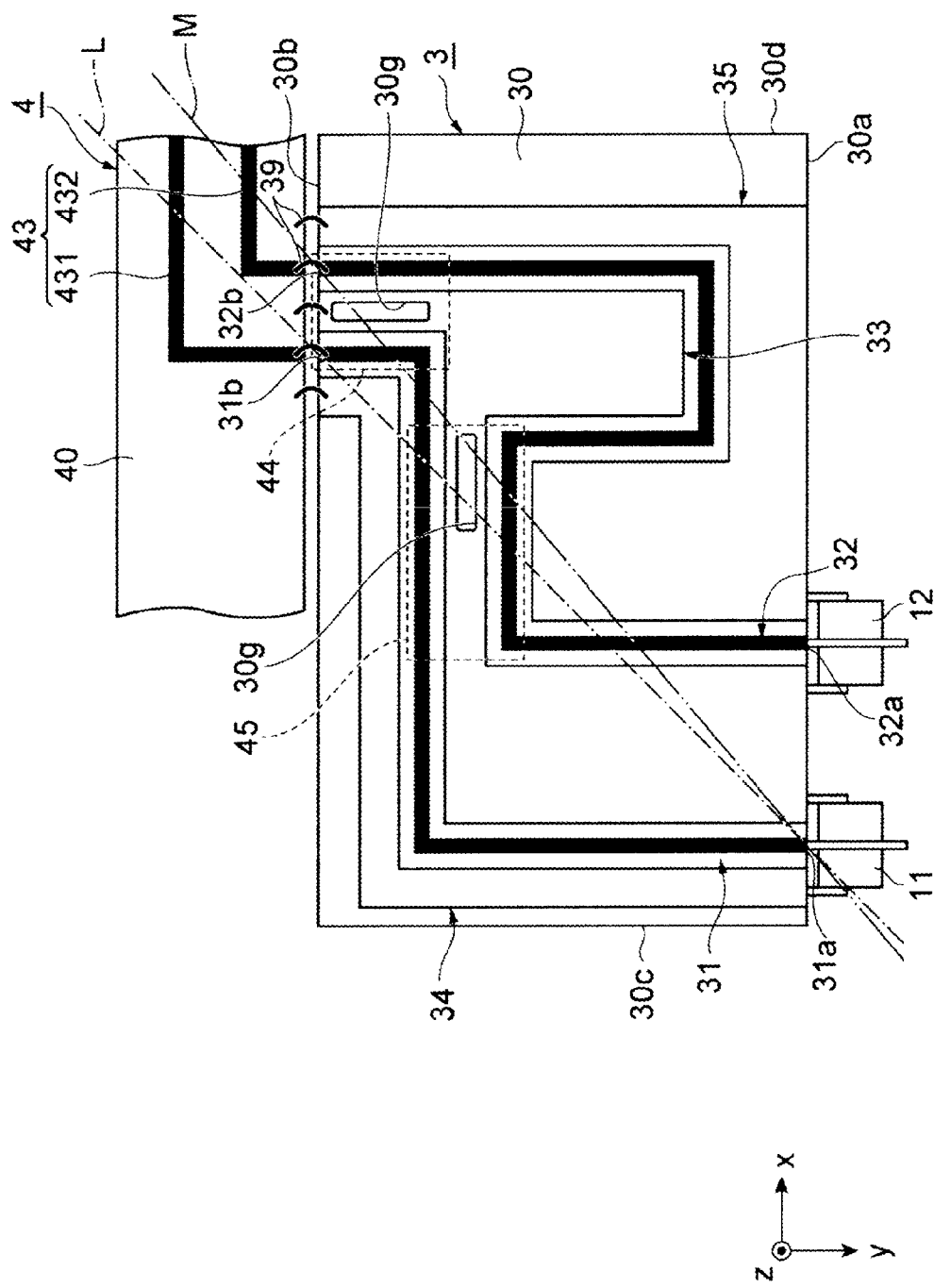
FIG. 9 is a view illustrating a position of a through-hole.

In addition, the through-hole 30g, the recess 51, or the aperture 52 may be disposed on at least one straight line among straight lines which connect any one end of the signal electrodes of the relay substrate 3 and any the other end of the signal electrodes of the relay substrate 3. For example, as illustrated in FIG. 9, the through-hole 30g, the recess 51, or the aperture 52 is disposed on at least one of a straight line L that connects one end 31a of the signal electrode 31 and the other end 31b of the signal electrode 31, and a straight line M that connects one end 31a of the signal electrode 31 and the other end 32b of the signal electrode 32. In an example illustrated in FIG. 9, the through-hole 30g is disposed on both of the straight line L and the straight line M. The connector 11 is connected to the one end 31a of the signal electrode 31, and thus an electrode configuration varies from a coaxial configuration to CPW. However, in a portion at which the electrode configuration varies, a radiation mode due to leakage of the electrical signal (modulation signal) is likely to occur, or input of the radiation mode is likely to occur. In addition, in the example illustrated in FIG. 9, for convenience of explanation, the through-hole 30h is not illustrated, but the through-hole 30h may be provided similar to the example illustrated in FIG. 6.

In addition, the other end 31b of the signal electrode 31 and the signal electrode 431 of the optical waveguide substrate 4 are connected by the wire bonding 39 and the like. With regard to an electrode structure at the connection site, the electrode structure varies from CPW to wire bonding, and from wire bonding to CPW on the optical waveguide substrate 4. Therefore, even in the vicinity of a connection point between the signal electrode 31 and the wire bonding 39, leakage of the electrical signal (modulation signal) is likely to occur, or input of the electrical signal is likely to occur. According to this, a radiation mode, which occurs in the vicinity of the one end 31a of the signal electrode 31 is recoupled in the vicinity of the other end 31b of the signal electrode 31, and is likely to cause degradation of modulation characteristics of the optical modulator. However, when employing the configuration illustrated in FIG. 9, the radiation mode, which occurs at the one end 31a of the signal electrode 31, can be trapped by the aperture. According to this, the radiation mode, which occurs at the one end 31a of the signal electrode 31, is prevented from being recoupled to the other end 31b of the signal electrode 31 and the other end 32b of the signal electrode 32. As a result, it is possible to suppress degradation of the modulation characteristics of the optical modulator 1.

In addition, the cross-sectional shape of the through-hole 30g, the recess 51, or the aperture 52 on the straight line L or the straight line M is not particularly limited. However, as illustrated in FIG. 9, in a shape extending in a direction in which the signal electrode 31 and the signal electrode 32 extend, it is possible to efficiently trap the radiation mode. In addition, even when the through-hole 30g, the recess 51, or the aperture 52 on the straight line L or the straight line M is not disposed at the first adjacent portion 44 and the second adjacent portion 45, it is possible to obtain a constant effect. In addition, in the configuration in which the through-hole 30g, the recess 51, or the aperture 52 is disposed on the straight line L or the straight line M, it is not necessary for the first adjacent portion 44 or the second adjacent portion 45 to be provided. That is, even when the first adjacent portion 44 or the second adjacent portion 45 is not provided, according to this configuration as described above, it is possible to suppress recoupling of the radiation mode, and thus it is possible to suppress degradation of the modulation characteristics of the optical modulator 1.

DESCRIPTION OF REFERENCE NUMERALS AND SIGNS

1: Optical modulator
3: Relay substrate
4: Optical waveguide substrate
30: Substrate portion
30g: Through-hole (aperture)
30h: Through-hole (another aperture)
31: Signal electrode (first signal electrode)
31a: One end
31b: The other end
32: Signal electrode (second signal electrode)
32a: One end
32b: The other end
33: Ground electrode
37: Low dielectric constant portion
40: Electro-optical substrate
42: Optical waveguide
44: First adjacent portion
45: Second adjacent portion
51: Recess (aperture)
52: aperture
331, 332: Branched ground electrode
431: Signal electrode (third signal electrode)
432: Signal electrode (fourth signal electrode)

The invention claimed is:
1. An optical device, comprising:
a relay substrate including a substrate portion, and a first signal electrode, a second signal electrode, and a ground electrode which are provided to the substrate portion; and
an optical waveguide substrate including an electrode-optical substrate having an electro-optic effect, a third signal electrode, a fourth signal electrode, and an optical waveguide which are provided on the electro-optical substrate, wherein modulation signals are input from one end of the first signal electrode and one end of the second signal electrode, respectively, the other end of the first signal electrode is electrically connected to the third signal electrode, the other end of the second signal electrode is electrically connected to the fourth signal electrode, an optical wave, which propagates through the optical waveguide, is modulated by the modulation signals which propagate through the third signal electrode and the fourth signal electrode, the ground electrode is provided between the first signal electrode and the second signal electrode, and the relay substrate includes an adjacent portion at which the first signal electrode and the second signal electrode are adjacent to each other, and an aperture that is provided in the ground electrode at the adjacent portion.

2. The optical device according to claim 1, wherein the adjacent portion is located in the vicinity of a position at which the first signal electrode is electrically connected to the third signal electrode, and the second signal electrode is electrically connected to the fourth signal electrode.

3. The optical device according to claim 1, wherein the ground electrode includes two branched ground electrodes, one of the two branched ground electrodes is disposed along the first signal electrode, and the other of the two branched ground electrodes is disposed along the second signal electrode.

4. The optical device according to claim 3, wherein the branched ground electrodes include another aperture.

5. The optical device according to claim 1, wherein a distance between the first signal electrode and the second signal electrode at the adjacent portion is 300 μm to 1000 μm.

6. The optical device according to claim 1, wherein a distance between the other end of the first signal electrode and the other end of the second signal electrode is shorter than a distance between the one end of the first signal electrode and the one end of the second signal electrode.

7. The optical device according to claim 1, wherein the aperture extends along a direction in which at least one of the first signal electrode and the second signal electrode, which are disposed on both sides of the aperture, extends.

8. The optical device according to claim 1, wherein the aperture is a recess formed by digging into the relay substrate, or a through-hole that passes through the relay substrate.

9. The optical device according to claim 8, further comprising:

a low dielectric constant portion that is provided in the recess or the through-hole, wherein the low dielectric constant portion has a dielectric constant lower than a dielectric constant of the substrate portion.

10. The optical device according to claim 1, wherein the optical waveguide substrate and the relay substrate further include one or more signal electrodes.

11. The optical device according to claim 1, wherein the aperture is disposed in a straight line connecting the one end of the first signal electrode and the other end of the first signal electrode, or in a straight line connecting the one end of the first signal electrode and the other end of the second signal electrode.

* * * * *